US 6,654,800 B1

(12) United States Patent
Rieger, III (10) Patent No.: US 6,654,800 B1
(45) Date of Patent: Nov. 25, 2003

(54) SYSTEM FOR COMMUNICATING THROUGH MAPS

(76) Inventor: Charles J. Rieger, III, 7417 River Falls Dr., Potomac, MD (US) 20854

( * ) Notice: Subject to any disclaimer, the term of this patent is extended or adjusted under 35 U.S.C. 154(b) by 0 days.

(21) Appl. No.: 09/524,888

(22) Filed: Mar. 14, 2000

(51) Int. Cl.[7] .............................................. G06F 15/173
(52) U.S. Cl. ...................................... 709/223; 709/203
(58) Field of Search ................................ 709/223, 203, 709/238; 370/352, 354

(56) References Cited

U.S. PATENT DOCUMENTS

| | | | |
|---|---|---|---|
| 5,493,286 A | | 2/1996 | Grube et al. |
| 5,564,018 A | | 10/1996 | Flores et al. |
| 5,682,525 A | | 10/1997 | Bouve et al. |
| 5,732,324 A | * | 3/1998 | Rieger, III ................. 455/3.01 |
| 5,742,769 A | | 4/1998 | Lee et al. |
| 5,828,839 A | | 10/1998 | Moncreiff |
| 5,850,433 A | | 12/1998 | Rondeau |
| 5,852,810 A | * | 12/1998 | Sotiroff et al. ................. 705/27 |
| 5,893,093 A | | 4/1999 | Wills |
| 5,898,680 A | * | 4/1999 | Johnstone et al. .......... 370/316 |
| 5,930,474 A | | 7/1999 | Dunworth et al. |
| 5,948,040 A | * | 9/1999 | DeLorme et al. ........... 701/201 |
| 5,948,041 A | | 9/1999 | Abo et al. |
| 5,990,886 A | * | 11/1999 | Serdy et al. ................. 345/752 |
| 6,031,467 A | | 2/2000 | Hymel et al. |
| 6,052,591 A | | 4/2000 | Bhatia |

(List continued on next page.)

FOREIGN PATENT DOCUMENTS

| | | |
|---|---|---|
| EP | 0 653 862 A1 | 5/1995 |
| EP | 0 734 189 A2 | 9/1996 |
| JP | 11-53278 | 2/1999 |
| JP | 11-257976 | 9/1999 |
| JP | 11-345184 | 12/1999 |
| JP | 2000-041063 | 2/2000 |
| JP | 2000-181814 | 6/2000 |
| JP | 2001-016248 | 1/2001 |
| JP | 2001-024689 | 1/2001 |
| JP | 2001-077842 | 3/2001 |

OTHER PUBLICATIONS

English–Language Abstract of European Patent Publication No. 653862A, 3 Pages (May 17, 1995—date publication of application).

English–Language Abstract of European Patent Publication No. 734189A, 2 Pages (Sep. 25, 1996—date of publication of application).

English–Language Abstract of Japanese Patent Publication No. 11–053278, 2 Pages (Feb. 26, 1999—date of publication of application).

(List continued on next page.)

*Primary Examiner*—Frantz B. Jean
(74) *Attorney, Agent, or Firm*—Sterne, Kessler, Goldstein & Fox, P.L.L.C.

(57) ABSTRACT

An HTTP server connected to the World Wide Web is described. The system allows a user to post arbitrary information to any geographical region simply by outlining the region on a map in the system's graphical user interface and attaching the information to the outlined region. Any user of the system can browse and receive these geographically relevant postings simply by identifying a point or region of interest on one of the system's maps. Users with registered accounts can elect to receive automatic email of postings that are relevant to one or more of their primary geographical coordinates. Mobile users can condition their cell phones or other communications devices to check into the system periodically to receive geographically relevant postings as they travel. The system can be used for communications with a geographically identified group, for governmental and commercial communications with a particular population, and for advertising, among other uses.

19 Claims, 4 Drawing Sheets

U.S. PATENT DOCUMENTS

| | | | |
|---|---|---|---|
| 6,060,995 | A | 5/2000 | Wicks et al. |
| 6,119,098 | A | 9/2000 | Guyot et al. |
| 6,138,009 | A | 10/2000 | Birgerson |
| 6,144,944 | A | 11/2000 | Kurtzman, II et al. |
| 6,148,261 | A | 11/2000 | Obradovich et al. |
| 6,151,596 | A | 11/2000 | Hosomi |
| 6,161,130 | A | 12/2000 | Horvitz et al. |
| 6,161,142 | A | 12/2000 | Wolfe et al. |
| 6,169,897 | B1 | 1/2001 | Kariya |
| 6,182,050 | B1 | 1/2001 | Ballard |
| 6,183,366 | B1 | 2/2001 | Goldberg et al. |
| 6,184,878 | B1 | 2/2001 | Alonso et al. |
| 6,185,599 | B1 | 2/2001 | Salimando et al. |
| 6,185,610 | B1 | 2/2001 | Nagatomo et al. |
| 6,205,432 | B1 | 3/2001 | Gabbard et al. |
| 6,219,691 | B1 | 4/2001 | Youn |
| 6,219,696 | B1 | 4/2001 | Wynblatt et al. |
| 6,233,428 | B1 | 5/2001 | Fryer |
| 6,237,022 | B1 | 5/2001 | Bruck et al. |
| 6,246,672 | B1 | 6/2001 | Lumelsky |
| 6,247,043 | B1 | 6/2001 | Bates et al. |
| 6,256,664 | B1 | 7/2001 | Donoho et al. |
| 6,374,079 | B1 * | 4/2002 | Hsu .......................... 455/11.1 |
| 6,393,014 | B1 * | 5/2002 | Daly et al. .................. 370/352 |
| 6,480,885 | B1 * | 11/2002 | Olivier ....................... 709/207 |

OTHER PUBLICATIONS

English–Language Abstract of Japanese Patent Publication No. 11–257976, 1 Page (Sep. 24, 1999—date of publication of application).

English–Language Abstract of Japanese Patent Publication No. 11–345184, 1 Page (Dec. 14, 1999—date of publication of application).

English–Language Abstract of Japanese Patent Publication No. 2000–041063, 1 Page (Feb. 8, 2000—date of publication of application).

English–Language Abstract of Japanese Patent Publication No. 2000–181814, 1 Page (Jun. 30, 2000—date of publication of application).

English–Language Abstract of Japanese Patent Publication No. 2001–016248, 1 Page (Jan. 19, 2001—date of publication of application).

English–Language Abstract of Japanese Patent Publication No. 2001–024689, 1 Page (Jan. 26, 2001 —date of publication of application).

English–Language Abstract of Japanese Patent Publication No. 2001–077842, 2 Pages (Mar. 23, 2001—date of publication of application).

"The Industry Standard Events," IDG Communications, http://www.idglist.com/managedlists/emaillists/theindustrystrdevents.htm, [internet], Jul. 17, 2001.

"E–mail & Internet Options for Dashboarders," Roadtrip America, http://www.roadtripamerica.com/dashboarding/connecting.htm, [internet], Jul. 17, 2001.

"Spam and Bulk E–mail," NPT Nonprofits' Policy and Technology Project, http://www.ombwatch.org./npt/nptalk/may2001/spam.html, [internet], May 29, 2001.

"Main Strike Internet Services Bulk–E Broadcast E–Mail," Main Strike, http://www.mainstrike.com/mstservices/internet/brdemail/brdemaileng.html, [internet], Jul. 17, 2001.

"Electronic Filings on Internet Domain Names," http://www.ntia.doc.gov/ntiahome/domainname/email/7_22−97comments.htm, [internet], Jul. 22, 1997.

"New Research from The Kelsey Group and Constat Reveals Wireless Media Business Model Emerging," The Kelsey Group, http://www.kelseygroup.com/pr001003.htm, [internet], Oct. 3, 2000.

"DG.0 2000 Workshop Report," National Science Foundation, Los Angeles, CA, May 15–17, 2000.

"Toward Improved Geographic Information Services within a Digital Government, Report of the NSF Digital Government Initiative Geographic Information System Workshop," The Board of Trustees of the University of Illinois, Jun. 1999.

* cited by examiner

Browse for Postings

Please identify the point or region of interest:

Draw

Reset

Submit

Category: Personal

Return this many hits: 5

Found 5 most recent postings:

| From | Email | Date | Category | Subject |
|---|---|---|---|---|
| Mary Smith | mary.smith@aol.com | Feb 26, 2000 at 4:05 pm | Personal | Looking for a snow blower |
| Andy Jones | drewster@comlink.com | Feb 26, 2000 at 2:23 pm | Personal | Garage sale next Saturday |
| Jeff Parker | rowlf_growlf@aol.com | Feb 26, 2000 at 12:30 pm | Personal | Tennis this afternoon anyone? |
| Linda Jensen | ljensen@hotmail.com | Feb 26, 2000 at 10:49 am | Personal | Anyone seen our gray cat? |
| Chuck O'Neil | chucko@netnow.com | Feb 26, 2000 at 9:57 am | Personal | House swap this summer? |

Figure 3

Account Information

User: Mary Smith

Email: mary.smith@aol.com  Update

Address (optional): 1234 Main St.
Bethesda, MD 23456  Update

Base antenna: Name: Home Lat: N38 23.04 Lon: 120 16.42  Change

Other antennas:

| Name | Latitude | Longitude | | |
|---|---|---|---|---|
| My Office | N38.50.04 | 77.15.42 | Change | Delete |
| Bill's Office | N38.52.18 | 77.48.23 | Change | Delete |
| Harker St. Palo Alto | N37.25.33 | 122.05.17 | Change | Delete |
| Dogwood Dr. McLean | N38.47.22 | 77.42.01 | Change | Delete |
| Reston Town Center | N38.47.26 | 77.55.26 | Change | Delete |

Named regions:

| Name | | |
|---|---|---|
| Our Neighborhood | Change | Delete |
| Greater McLean | Change | Delete |
| Reston Center | Change | Delete |

Notification Filters:

| Antenna | Post Category | Overlaps With | by % | Send as Email | | |
|---|---|---|---|---|---|---|
| Home | Any | Our Neighborhood | 50 | ✓ | Change | Delete |
| My Office | Community | Reston Center | 75 | ✓ | Change | Delete |
| Bill's Office | Community | Greater McLean | 75 | ✓ | Change | Delete |

Figure 4

SYSTEM FOR COMMUNICATING THROUGH MAPS

BACKGROUND OF THE INVENTION

1. Field of the Invention

This invention relates to the one-way communication of information, a "posting", from a source agent to a target user community via a computer server connected to a wide-area network such as the Internet. In particular, the target user community for a posting is defined in terms of geographical coordinates, e.g., by a bounded region on a map. Targeted users, i.e., those whose geographical location falls within the bounded region of a posting, receive notification of the posting either automatically via email, or by logging on to the server and browsing for geographically relevant notifications via a graphical user interface.

The system described herein is intended to service mobile users as well as stationary users. Mobile users who pass through the targeted area of various postings can automatically receive those postings via their wireless connection as they travel, resulting in information automatically flowing to them at the posted information's point of relevance.

2. Related Art

Three areas of prior art, geographical product and services databases, one-way communication of information to its "point of relevance", and communication of information via the Internet, are relevant. This invention builds upon elements found in these three areas of prior art. However, its overall purpose, methods, and implementation differ substantially from all known disclosures. Specifically, there is no known literature describing a communication system that targets unsolicited information to an anonymous user community identified only by a bounded region on a map. U.S. Pat. No. 5,990,886 to Serdy et al. describes a system for filtering a specific email list by geographic area. In this system, a user obtains a list of email recipients by querying a database or other means, then selectively narrows this list by filtering each recipient based on geographic location. There is no notion of posting information to a geographical region, where there may or may not be any recipients, nor of using a region of a map to communicate with an anonymous user community. Serdy et al. also contains no idea of delivering arbitrary information to its point of relevance, nor of users browsing for posted information via geographical coordinates.

U.S. Pat. No. 5,948,041 to Abo et al. describes a system wherein a mobile user contacts a database whose elements include location data. The system determines which database items are most relevant based on the mobile user's location, and communicates the results to the user. This system employs user-initiated queries, coupled with geographic position information, to access the most relevant items in a database. There is no notion of unsolicited communication from a single agent to an anonymous user community in this disclosure.

U.S. Pat. No. 5,930,474 to Dunworth, et al., U.S. Pat. No. 5,682,525 to Bouve et al., and U.S. Pat. No. 5,850,433 to Rondeau all describe systems that permit users to browse for geographically indexed goods and services, then to obtain specific information and/or invoke actions relating to the goods and services thus located. As with Abo et al., these systems are predicated upon user-initiated searches for database items based partially on those items' geographical content. There is no notion in any of these disclosures of using geographical regions as a means to communicate with an anonymous user community.

U.S. Pat. No. 5,898,680 to Johnstone et al. describes a system that is capable of downloading information from a satellite to a remote location, where methods filter the general information thus downloaded based on the remote location's coordinates as determined by a GPS. The net result of their system is that the end user receives "location-specific data tailored to the needs of the user". This system uses geographical information to filter data, but does not relate to the notion of using maps to communicate with an anonymous user community.

U.S. Pat. No. 5,852,810 to Sotiroff et al. describes a system that permits users to search for property listings via a map-based user interface that also takes into account other property-related search criteria. This system is aimed at narrowing a search for geographically indexed items, but includes no notion of using the map as a basis of communicating with other people through maps.

U.S. Pat. No. 5,893,093 to Wills describes an information search and retrieval process using geographical coordinates, which permits users to locate textual references based on geographical location. This system appears to have only marginal relevance to the invention disclosed herein.

U.S. Pat. No. 5,732,324 to Rieger describes a one-way radio communication system designed to communicate several-minute audio programs at a high transfer rate to passing vehicles. While the specific technology disclosed in this patent is not relevant to the present invention, this patent shares the goal of delivering unsolicited information from one user to many anonymous users at the information's point of relevance.

SUMMARY OF THE INVENTION

It is a first objective of the invention to provide a method for associating arbitrary information with a geographical region of relevance, as defined, e.g., by a closed outline on a map. Information so associated with a geographical region of relevance shall be termed a "posting".

It is a second objective of the invention to provide a method for communicating the information content of a posting to individuals who are situated in, or who pass through, the posting's geographical region of relevance.

It is a third objective of the invention to provide a system that implements these methods and makes them accessible to a user community via a graphical user interface designed to run in the context of a wide area network such as the Internet.

PURPOSE OF THE INVENTION

This invention empowers people to communicate with one-another through geography, rather than by individual identity. In a typical scenario, a user selects a target audience by drawing a closed outline around the target community on a map. The user then "posts" the desired information to a region thus identified on the map. Potential recipients of the information, i.e., those within the designated region, receive notification of the posting and can act on its information content in any appropriate way.

Example societal uses of this invention are:

To ask questions of a local population. For example, if the target region is a neighborhood, a user could find a tennis partner, locate a desired item for sale, ask if any homes were on or about to come onto the market for sale, or ask a communityrelated question by "posting to the neighborhood".

To ask questions of a larger population. For example, if the target region is a city, one family could look for another family wishing to house-swap by posting a request to the region.

To initiate contact with individuals. If, for instance, the target is a particular home within a community, i.e., a very small geographical region, a user could communicate directly with the residents of the home without having any prior knowledge about them.

To post community or regional announcements. State, county, and local organizations could post news about topical events to residents in relevant regions.

To post traffic and road construction news. Mobile users could automatically receive news about traffic and road conditions relevant to a city block, an interchange, or a commuting corridor as they passed through.

To advertise. The system can be used to implement "virtual billboards". Businesses wishing to get their message out could post advertisements to specific regions, e.g., several city blocks, or a long narrow region covering a particular section of an interstate highway. Mobile users passing through such regions would automatically receive the information.

To educate and inform. The National Park Service could, for example, post information about-sites of historical interest. Vacationers, connected to the Internet via wireless, would receive such information when visiting the site, or prior to visiting by browsing the system's maps.

DETAILED DESCRIPTION OF THE INVENTION

In its preferred embodiment, this invention is implemented as a Web server connected to the Internet. Users connect to this system either via standard Web browsers such as Microsoft's Internet Explorer and Netscape's Navigator, or via mobile PC's and cell phones, which connect to the Internet via wireless technology.

Maps

The system includes a series of geographical maps that cover the intended service area, e.g., county, metropolitan area, state, country, or world, to a sufficient level of visual detail. These maps serve as the basis of much of the system's GUI.

Postings Database

The system maintains a database of postings. At a minimum, each posting comprises three parts:

1. An identification tag that describes who has posted it, when it was posted, what its posting category is, and other such factual information about its origin. Examples of posting categories are "Personal", "Neighborhood", "Community", "Governmental", "Commercial", "Educational", and so forth. Each such category might be further refined by subcategories, e.g., Governmental/Road_Construction.

2. An information component, which is the content of the posting. As with ordinary email, this component could be just a simple textual message, or it could include a reference to one or more Web pages containing graphics, audio, links, etc.

3. A "broadcast" descriptor, which identifies the posting's geographical target region. This descriptor would typically be represented by closed geometrical object such as a polygon or circle in a 2-dimensional geographical coordinate space, although it could also include 3-D elevation information as well. Users would typically define such a region by using the system's GUI to outline it on one of the system's maps. The system would also support compound regions, i.e., regions identified by more than one bounded object on the system's maps.

User Accounts Database

The system also maintains a database of user accounts. At a minimum, each user account comprises three parts:

1. A user identification component, which describes the user's identity, e.g., name, email, address, etc., as well as operational preferences and settings, such as whether or not automatic email notification of relevant postings is desired.

2. An "antenna" descriptor, which describes the user's "base" location, e.g., the location of the user's residence, in geographical coordinate space. A user would typically define this antenna descriptor by drawing an outline or cross hair on one of the system's maps. In addition to the antenna descriptor for the base location, each user account would be capable of maintaining a list of additional antenna descriptors, permitting the user to intercept postings relevant to multiple locations of interest.

3. A notification list, which records postings whose broadcast descriptor has intersected with one or more of the user's antenna descriptors. This list makes the connection between the user and postings that are determined to be relevant to that user.

Pattern-matching Engine

The system includes a pattern-matching engine that constantly runs as a background process. This engine is capable of finding intersections between broadcast descriptors and antenna descriptors, system-wide. Upon finding an intersection for the first time, the engine adds the posting to the notification list of the relevant user account, noting which of the user's antenna descriptors "received" the posting.

Reception Filters and Named Regions

Each user account can accept and store "reception filters", which describe the content type and/or broadcast descriptor constraints that any posting must satisfy in order for the pattern matching engine to add it to the user account's notification list. Broadcast descriptor filters would, for example, be capable of filtering out postings whose target region was too broad, by requiring that the posting's target area be under a specified size in square miles in order to qualify for reception. Another type of filter would require that the broadcast region have a minimal overlap, e.g., 75%, with some user-specified region such as the user's neighborhood.

Named Regions

Each user account can maintain a user-defined list of named regions. The user can add new regions to this list by drawing an outline on the system's map, then giving the outlined region a name. Once defined, a named region can then be used either in conjunction with reception filters, or as the broadcast descriptor for a new posting.

Notification Processing and Direct Email

The system permits any user account to accept and store preferences governing the disposition of accumulated notifications. One such preference, for example, would direct the system to forward some or all notifications to the user as ordinary email. In this case, the end effect would be that the user receives direct email from other users whose postings have intersected one or more of the user's antenna descriptors. Regardless of whether or not such automatic email has been enabled, the system would always permit a user to log on and manually browse notifications, or to browse arbitrary regions of the systems maps for postings relevant to those regions.

Mobile Users

The system is also capable of managing a transient antenna descriptor for any user account, i.e., an antenna descriptor that would correspond to the continually changing location of a mobile user. In typical use, the mobile user's PC or cell phone would have access to Global Positioning System (GPS) technology, and would know its location at any given moment. The mobile unit would periodically connect to the system via its wireless channel to the Internet, e.g., every several minutes, and would identify itself as a mobile unit, give its user account ID, if any, and indicate its current GPS coordinates. The system would record and track this continually changing location via the transient antenna descriptor, and would send any non-redundant postings relevant to the current location at each check-in time. The system would also be capable of deducing the user's approximate route in-between check-in points, and would automatically find and send any postings deemed to have been appropriate in the missed intervals.

Users with No Accounts

The system is also capable of servicing anonymous users, i.e., those with no registered account. Such users could place themselves at arbitrary points on the system's maps and browse the relevant postings at those points. For unregistered mobile users, the system would set up and maintain a temporary account, including a transient antenna descriptor, that would time out and be garbage collected after some predefined period of inactivity.

Passwords on Postings

The system can also manage an optional password on any posting. For any posting with a password, the system would require any user wishing to view or receive the posting's information content to present the correct password before allowing the user access to the posting's content. This feature would be most useful for communications among a group of closely-knit users, such as the residents of a neighborhood or community.

Authorizations to Create New Postings

Administrators of the system can restrict the nature of postings created by any particular user by defining geographic regions into which the user is either authorized or unauthorized to post. Authorized regions can be assigned optional passwords and posting category restrictions that further narrow the user's posting privileges in those regions. These controls would, for example, permit system administrators to grant specific privileges to a regional authority to create postings of particular categories, e.g., Governmental/Traffic, Governmental/Weather, to particular regions, while excluding all other users from posting those categories to the regions.

System Architecture and Implementation

Figure 1:
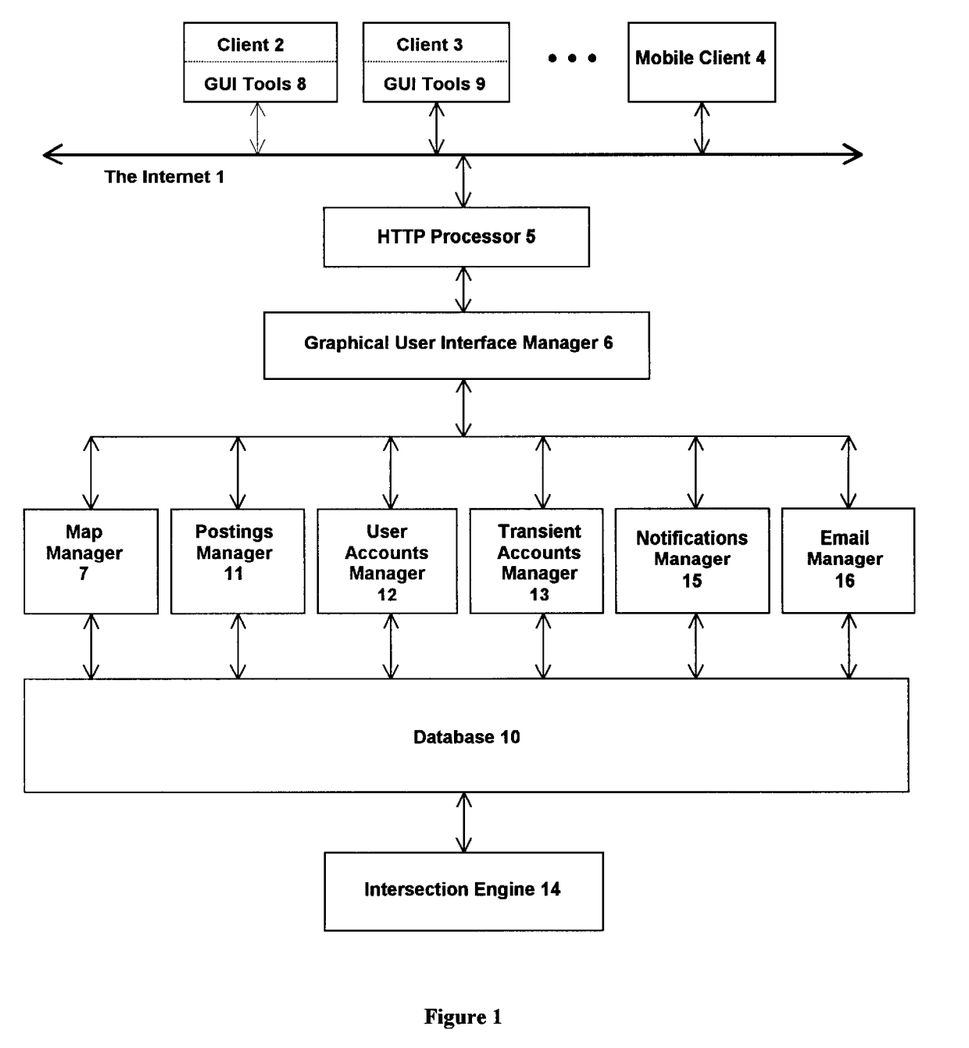
FIG. 1 is a block diagram of the system, which places the system in its global context, i.e., as an HTTP server on the Internet with a map-based graphical user interface (GUI), and which shows the system's logical components and their interrelationships.

Referring to FIG. 1, in its preferred embodiment the system is implemented as a World Wide Web server on the Internet (1). Clients (2, 3, 4), both stationary and mobile, connect to the system via Hypertext Transfer Protocol (HTTP) (5) using standard Web browsers. The system's Graphical User Interface Manager (6) processes user transactions, and dynamically composes HTML responses containing maps and other graphical elements, drawing in part upon the system's Map Manager (7), which manages maps covering the system's intended service area. The GUI permits users to interact with the system's maps via zoom, pan, and drawing primitives, which are implemented partially on the server side and partially on the client side, e.g., through Java classes (8,9) that are automatically made available when the user connects. Mobile users would interact with the system via an interface appropriate to the particular technology of the mobile communications device.

The system's Database (10) stores information about postings, permanent and transient user accounts, notifications, email addresses, etc., and is the storage backbone of the system. The system's Postings Manager (11) stores and retrieves information about postings on demand from the GUI. The User Accounts Manager (12) stores and retrieves user account information on demand from the GUI. The Transient Accounts Manager (13) tracks users who have connected to the system but who have no registered accounts, and is responsible for creating a transient account when such a user connects for the first time, and for garbage collecting the transient account after a suitable period of inactivity. The system's Intersection Engine (14) continually runs as a background computation thread, looking for intersections between postings' broadcast descriptors and user-defined antenna descriptors, and storing newly discovered intersections in the appropriate notifications lists within transient and permanent user accounts. The Notifications Manager (15) is capable of presenting notifications to users on demand from the GUI as users browse for relevant notifications. The Email Manager (16) detects the presence of any newly generated notifications that, based upon user preferences, should trigger email, and is responsible for sending email to relevant users.

Figure 2:
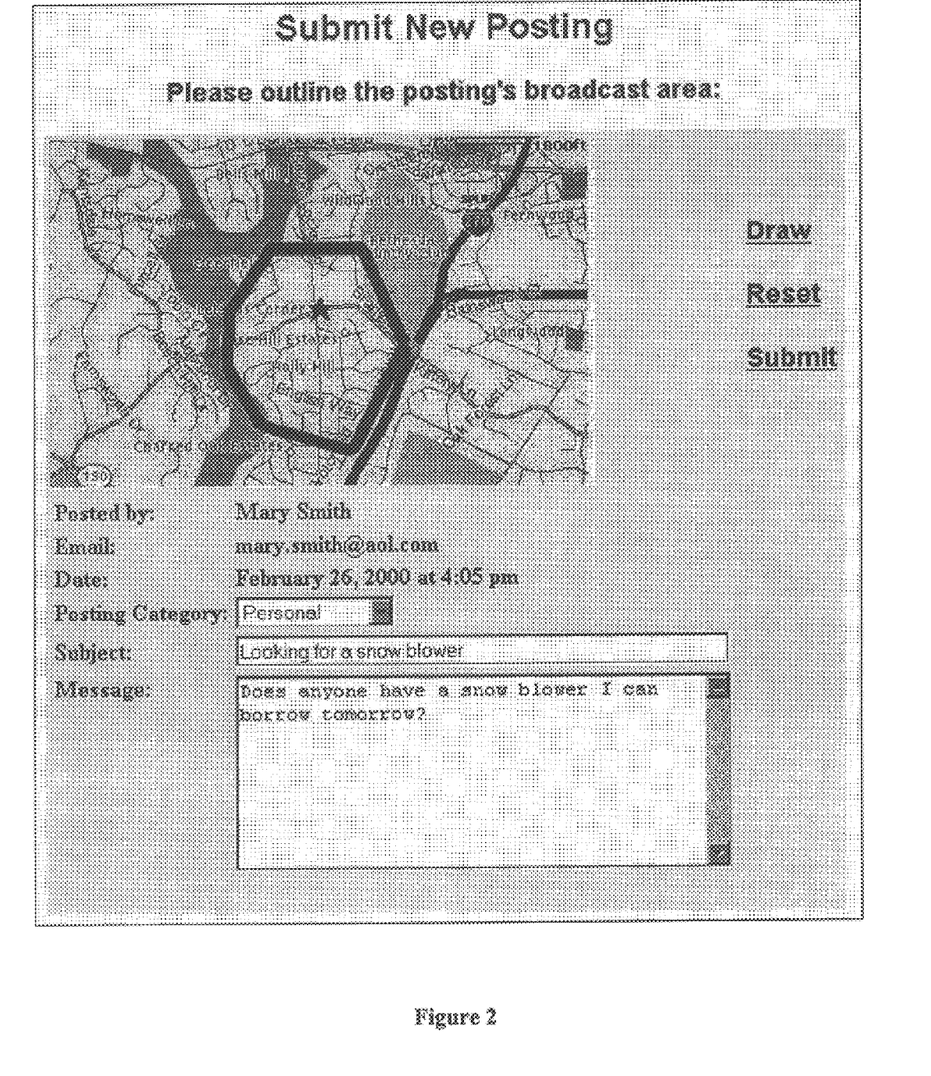
FIG. 2 shows an example user interface that illustrates the use of an online map to define a new posting's region.

FIG. 2 illustrates an example user interface that would be presented to a user desiring to create a new posting. In this example, the user has outlined a neighborhood, and is asking if anyone has a snow blower the user can borrow.

Figure 3:
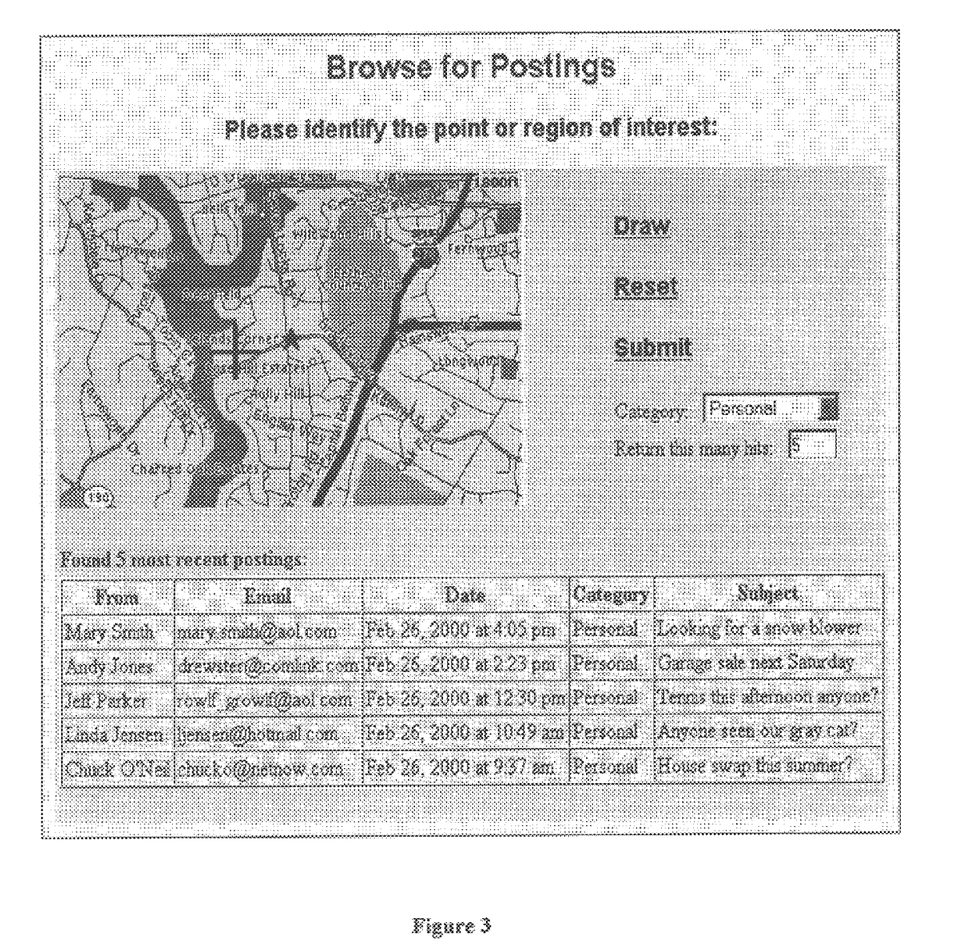
FIG. 3 shows an example user interface through which a user can receive notifications by manual browsing.

FIG. 3 illustrates an example user interface by which a user would manually browse for postings relevant to a particular region. In this example, the user has defined a single point of interest via a cross hair on the map, and the system has retrieved a list of the five most recent postings relevant to that point of interest and not yet seen by the user.

Figure 4:
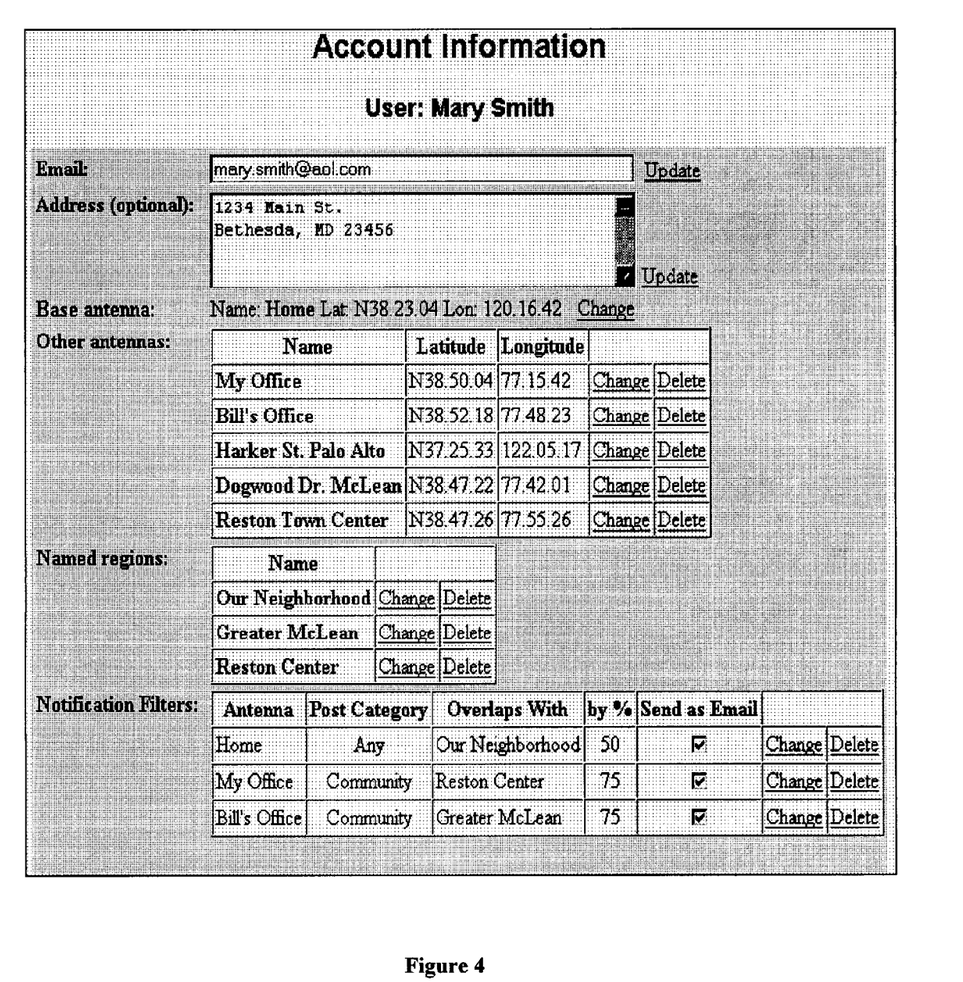
FIG. 4 illustrates an example user interface through which a user can set up account information and operational preferences.

FIG. 4 illustrates an example user interface by which a user can set up and view account information and operational preferences. In this example, the user has defined several antenna descriptors and named regions by previously interacting with the system's maps. The user has also defined some antenna filters that describe the types of postings for which notifications and automatic email are desired.

Although the present invention has been fully described in connection with the preferred embodiment thereof with reference to the accompanying drawings, it is to be noted that various changes and modifications will be apparent to those skilled in the art. For example, other system block diagrams can lead to a functionality equivalent to that described herein, the particular methods used to implement the functional components of the system might vary, and the look, feel, and specific contents of the user interfaces can have many variations. Such changes and modifications are to be understood as included within the scope of the present invention as defined by the appended claims, unless they depart therefrom.

I claim:

1. A computer system comprising:

means for storing and managing a plurality of postings, each posting including a source identification tag, an information body, and a broadcast descriptor, said broadcast descriptor identifying a geographical region of said each posting, wherein said geographical region is defined by a closed region on a map; and means for receiving-and accepting a plurality of requests from mobile and stationary users, each request from a user including a user identification tag and an antenna descriptor, said antenna descriptor identifying a geographical location of said user; and means for processing said each request by identifying and sending to said user postings having geographical regions that contain said geographical location of said user, wherein said means for processing said each request operates on all requests of said users; and means for processing a subsequent request from said user, said subsequent request including a user identification tag and an antenna descriptor specifying a subsequent geographical location of said user, said subsequent geographical location being a current location of said user, wherein said means for processing said subsequent request sends to said user other postings having geographical regions that contain said subsequent geographical location of said user, wherein said other postings do not include any posting previously sent to said user.

2. The system of claim 1, further comprising:

means for storing and managing a plurality of user accounts corresponding to said stationary and mobile users, each said user account including at least one user identification tag and corresponding antenna descriptor.

3. The system of claim 2, wherein said means for processing said each request by identifying and sending includes means for sending postings via email to users associated with said plurality of user accounts.

4. The system of claim 2, further comprising:

means for accepting definitions of, and removing definitions of, said postings and said plurality user accounts via a graphical user interface; and means for displaying said postings and information related to said plurality of user accounts via said graphical user interface.

5. The system of claim 4, wherein said graphical user interface displays geographical maps to depict at least one of a broadcast descriptor and an antenna descriptor, wherein said mobile and said stationary users use said graphical user interface to draw on said geographical maps with interactive drawing tools to define said at least one of a broadcast descriptor and an antenna descriptor.

6. The system of claim 2, further comprising:

means for automatically creating and maintaining a transient user account for a transient user that does not have a user account of said plurality of user accounts, said transient user account including at least one user identification tag and corresponding antenna descriptor, and serving as a temporary user account until timed out and garbage collected after a predefined period of inactivity of said transient user.

7. The system of claim 6, wherein said antenna descriptors of said transient user accounts enable said system to find and send postings to a mobile transient user based on global positioning system (GPS) coordinate data from a mobile communications device of said mobile transient user.

8. The system of claim 2, wherein said user accounts have associated user preferences, said user preferences including logical filters specifying further characteristics of said postings that must be present for said postings to be sent to the corresponding user.

9. The system of claim 2, further comprising:

means for storing said postings having geographical regions that contain said geographical location of a particular user in a user account of said particular user; and means for permitting said particular user to define criteria to determine when postings stored in a user account of said particular user are to generate email to said particular user.

10. The system of claim 2, further comprising:

means for restricting the posting authority of any said user account by accepting and storing a plurality of authorized region descriptors and unauthorized region descriptors, any said authorized region descriptor optionally having at least one of an associated posting password and posting category restriction list;

wherein the system requires said at least one of said posting password and said category restriction list to be respected by any posting having geographical regions that contain said geographical location of a particular user in a user account of said particular user before said system will accept and store said posting.

11. The system of claim 1, wherein said geographical region is a closed region defined on a map by latitude and longitude.

12. The system of claim 11, wherein said geographical region is further defined by vertical distance from sea level.

13. The system of claim 1, wherein the system is a server connected to a wide-area network.

14. The system of claim 1, wherein the system is a server coupled to the Internet.

15. The system of claim 1, wherein the system is an HTTP server connected to the Internet, wherein said mobile and said stationary users interact with the system via standard Web browsers.

16. The system of claim 1, further comprising:

means for maintaining a record for a particular user of which said postings having geographical regions that contain said geographical location of said particular user, wherein said record does not maintain duplicates of said postings having geographical regions that contain said geographical location of said particular user.

17. The system of claim 1, wherein said each posting further includes a password, said password being required to be used by any user requesting to view said information body of said posting.

18. The system of claim 1, wherein said each posting includes an optional activation time period, said activation time period including a start time and a stop time, said start time and said stop time governing the duration of an availability a respective posting to users.

19. The system of claim 1, further comprising:

means for recording user transaction data, said user transaction data including information related to a duration of contact a respective user has with the system, and a record of actions performed within said duration by said respective user.

* * * * *

UNITED STATES PATENT AND TRADEMARK OFFICE
CERTIFICATE OF CORRECTION

PATENT NO. : 6,654,800 B1
DATED : November 25, 2003
INVENTOR(S) : Charles J. Rieger, III It is certified that error appears in the above-identified patent and that said Letters Patent is hereby corrected as shown below:

Title page,
Item [56], References Cited, U.S. PATENT DOCUMENTS, please insert the following citations:
-- 6,324,472 B1
   6,490,521 B2
   6,480,783 B1
   6,249,252 B1
   6,321,158 B1 --
OTHER PUBLICATIONS, please insert the following citation:
-- Copy of International Search Report issued April 10, 2003 for Appl. No. PCT/US02/41220, 8 pages --.

Column 7,
Line 31, please replace "receiving-and" with -- receiving and --.

Column 10,
Line 5, please replace "availability a" with -- availability of a --.

Signed and Sealed this

Twentieth Day of April, 2004

JON W. DUDAS
*Acting Director of the United States Patent and Trademark Office*